(12) United States Patent
Caldwell et al.

(10) Patent No.: US 9,052,033 B2
(45) Date of Patent: Jun. 9, 2015

(54) VALVE ASSEMBLY

(75) Inventors: Niall James Caldwell, Edinburgh (GB);
Uwe Bernhard Pascal Stein, Edinburgh (GB); William Hugh Salvin Rampen, Edinburgh (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 1022 days.

(21) Appl. No.: 13/141,527

(22) PCT Filed: Dec. 22, 2009

(86) PCT No.: PCT/GB2009/051763
§ 371 (c)(1),
(2), (4) Date: Sep. 15, 2011

(87) PCT Pub. No.: WO2010/073041
PCT Pub. Date: Jul. 1, 2010

(65) Prior Publication Data
US 2011/0315004 A1 Dec. 29, 2011

(30) Foreign Application Priority Data

Dec. 22, 2008 (EP) .................................... 08172665
Dec. 22, 2008 (EP) .................................... 08172666

(51) Int. Cl.
*F15B 13/04* (2006.01)
*F16K 31/08* (2006.01)
(Continued)

(52) U.S. Cl.
CPC ............... *F16K 31/082* (2013.01); *F16K 47/08* (2013.01); *F16K 31/0655* (2013.01)

(58) Field of Classification Search
CPC ........ F16K 31/082; F16K 47/02; F16K 47/08
USPC ......... 91/418, 454, 459; 251/129.21; 417/505
See application file for complete search history.

(56) References Cited

U.S. PATENT DOCUMENTS

| 3,921,668 A | 11/1975 | Self |
| 4,058,287 A | 11/1977 | Fromfield |

(Continued)

FOREIGN PATENT DOCUMENTS

| EP | 0023172 | 1/1981 |
| GB | 799024 | 12/1954 |

(Continued)

OTHER PUBLICATIONS

International Search Report for PCT/GB2009/051762, mailed Mar. 8, 2010.

*Primary Examiner* — Michael Leslie
(74) *Attorney, Agent, or Firm* — Lowe Hauptman & Ham, LLP (57) ABSTRACT

A valve assembly suitable for regulating the flow of fluid between a working chamber of a fluid-working machine and a fluid manifold. The valve assembly comprises a valve body comprising a valve seat, a fluid passage extending through the valve body, and a travelling member comprising a valve member, which valve member is operable between an open position in which the valve member is spaced apart from the valve seat and fluid can flow through the fluid passage and a closed position in which the valve member is in sealing contact with the valve seat preventing fluid from flowing through the fluid passage. The valve assembly defining a fluid flow path passing, in a first fluid flow mode, between the valve member and the valve seat, and into the fluid passage. The valve assembly is characterized by defining a fluid flow path including a constricted flow region and further comprising a reduced pressure chamber in communication with both a first surface of the travelling member and the constricted flow region, arranged to exert a force on the travelling member by way of a pressure reduction in the reduced pressure chamber when fluid is flowing along the fluid flow path, through the constricted flow region, which force acts to resist closure of the valve. Thus, a force is generated which opposes forces acting on the valve member due to the flow of fluid past the valve member.

18 Claims, 6 Drawing Sheets

(51) Int. Cl.
*F16K 47/08* (2006.01)
*F16K 31/06* (2006.01)

(56) References Cited

U.S. PATENT DOCUMENTS

| | | | |
|---|---|---|---|
| 4,067,360 | A | 1/1978 | Zirps |
| 4,112,978 | A | 9/1978 | Olbrich et al. |
| 4,301,827 | A | 11/1981 | Murthy et al. |
| 4,315,526 | A | 2/1982 | Ohtomo |
| 4,735,224 | A | 4/1988 | Pluviose |
| 5,163,654 | A | 11/1992 | Borsatti et al. |
| 5,535,725 | A * | 7/1996 | Baker et al. ............. 251/129.15 |
| 5,549,274 | A | 8/1996 | Buchanan et al. |
| 5,791,339 | A | 8/1998 | Winter |
| 6,655,409 | B1 | 12/2003 | Steenburgh et al. |
| 7,089,961 | B2 * | 8/2006 | Morton et al. ............. 137/625.3 |
| 2006/0005889 | A1 | 1/2006 | Takahashi et al. |
| 2006/0070666 | A1 | 4/2006 | Takemaru |

FOREIGN PATENT DOCUMENTS

| | | |
|---|---|---|
| GB | 2 016 168 | 9/1979 |
| GB | 2276222 | 9/1994 |
| GB | 2 404 965 | 2/2005 |
| JP | 60146966 | 8/1985 |
| JP | 8511607 | 12/1996 |
| RU | 2099623 | 12/1997 |
| RU | 2003116179 | 1/2005 |
| WO | 9306400 | 4/1993 |
| WO | 9500789 | 1/1995 |
| WO | WO 01/69114 | 9/2001 |

* cited by examiner

VALVE ASSEMBLY

This application is the U.S. national phase of International Application No. PCT/GB2009/051763, filed 22 Dec. 2009, which designated the U.S. and claims priority to EP Application No. 08172665.5, filed 22 Dec. 2008; and EP Application No. 08172666.3, filed 22 Dec. 2008, the entire contents of each of which are hereby incorporated by reference.

FIELD OF THE INVENTION

The invention relates to the field of valve assemblies suitable for regulating the flow of fluid between a working chamber of a fluid working machine and a fluid manifold including, but not limited to, electronically controllable valve assemblies.

BACKGROUND TO THE INVENTION

Fluid working machines include fluid-driven and/or fluid-driving machines, such as pumps, motors, and machines which can function as either a pump or as a motor in different operating modes. Although the invention will be illustrated with reference to applications in which the fluid is a liquid, such as a generally incompressible hydraulic liquid, the fluid could alternatively be a gas.

When a fluid working machine operates as a pump, a low pressure manifold typically acts as a net source of fluid and a high pressure manifold typically acts as a net sink for fluid. When a fluid working machine operates as a motor, a high pressure manifold typically acts as a net source of fluid and a low pressure manifold typically acts as a net sink for fluid. Within this description and the appended claims, the terms "high pressure manifold" and "low pressure manifold" refer to manifolds with higher and lower pressures relative to each other. The pressure difference between the high and low pressure manifolds, and the absolute values of the pressure in the high and low pressure manifolds will depend on the application. A fluid working machine may have more than one low pressure manifold and may have more than one high pressure manifold.

The invention concerns valve assemblies suitable for use in regulating the flow of fluid between a working chamber of a fluid working machine and a manifold. The valve assemblies include a valve member and valve seat and, accordingly, are face-seating. Valve assemblies according to the invention may be useful with a wide range of types of fluid working machine. However, issues concerning the invention will now be discussed with reference to the specific example of valve assemblies suitable for use with known fluid working machines which comprise a plurality of working chambers of cyclically varying volume, in which the displacement of fluid through the working chambers is regulated by electronically controllable valves, on a cycle by cycle basis and in phased relationship to cycles of working chamber volume, to determine the net throughput of fluid through the machine.

For example, EP 0 361 927 disclosed a method of controlling the net throughput of fluid through a multi-chamber pump by opening and/or closing electronically controllable poppet valves, in phased relationship to cycles of working chamber volume, to regulate fluid communication between individual working chambers of the pump and a low pressure manifold. As a result, individual chambers are selectable by a controller, on a cycle by cycle basis, to either displace a predetermined fixed volume of fluid or to undergo an idle cycle with no net displacement of fluid, thereby enabling the net throughput of the pump to be matched dynamically to demand. EP 0 494 236 developed this principle and included electronically controllable poppet valves which regulate fluid communication between individual working chambers and a high pressure manifold, thereby facilitating the provision of a fluid working machine functioning as either a pump or a motor in alternative operating modes. EP 1 537 333 introduced the possibility of part cycles, allowing individual cycles of individual working chambers to displace any of a plurality of different volumes of fluid to better match demand.

Fluid working machines of this type require rapidly opening and closing electronically controllable valves capable of regulating the flow of fluid into and out of a working chamber from and into the low pressure manifold, and in some embodiments, the high pressure manifold. The electronically controllable valve which regulates fluid flow between a working chamber and the low pressure manifold is typically oriented such that the valve member (for example, a poppet valve head) moves in the same sense as the direction of fluid flow through the valve seat during an exhaust stroke in which fluid is vented to the low pressure manifold. During an idle exhaust stroke, where fluid which was received from the low pressure manifold in the preceding intake stoke is returned to the low pressure manifold, the peak rate of fluid flow is very high. In these circumstances, forces arising from at least four different phenomena, which we will now describe, urge the poppet valve head towards the valve seat.

1. In order to facilitate rapid fluid flow with minimal energy losses while minimising the distance over which the poppet head must travel, it is advantageous to maximize the cross-sectional area of the fluid flow path, minimise the gap between the valve seat and the poppet head, and maximize the fluid volume around the rest of the poppet head. This means that the fluid flows fastest in the gap between the poppet head and valve seat. As a result, there is a kinetic energy related pressure drop which is at its greatest (leading to a minimum of fluid pressure) between the poppet valve head and the valve seat, which force acts to close the valve. Kinetic energy related forces are proportional to the square of the fluid velocity and fluid density and this force applies during both intake and exhaust strokes.

2. Viscous drag arising from the flow of fluid across the surface of the poppet valve head acts at a tangent to the poppet head surface. There is always a component of the poppet head surface tangent in the closing direction, so viscous drag acts to pull the poppet valve closed during exhaust strokes. Viscous drag is proportional to the product of fluid velocity and fluid viscosity, and is particularly important at low temperatures.

3. As the fluid splits and diverts past the front of the poppet valve head it must internally shear as its shape changes. This leads to a high pressure region on the upstream surface of the poppet valve heat and a low pressure region on the inward surface (where the diverted flow rejoins). The resulting pressure differential acts to close the poppet valve. Shear forces are proportional to the product of fluid velocity and fluid viscosity, and are also particularly important at low temperatures.

4. The fluid mass must also be accelerated perpendicular to the axis of flow so that it diverts around the poppet valve head. The acceleration raises pressure within the fluid at the poppet and therefore also applies forces normal to the face being diverted around (the so-called 'jet effect'). These forces are felt by the poppet valve head and, because poppet valve heads typically have cone or bullet shaped upstream faces in order to reduce shear forces, the resulting forces have a component in the closing direction of the poppet. These acceleration-related forces are proportional to the product of fluid density and fluid viscosity.

The magnitude of the resulting forces varies depending on temperature, fluid viscosity, instantaneous flow rate and the configuration of the valve. For example, in some valves, fluid impinges on the side of the valve member before flowing between the valve member and the valve seat, rather than the upstream surface, affecting the relative magnitude of these forces.

As a result of these forces, there can be a risk of involuntary pumping strokes occurring, in which fluid is displaced which was not demanded by the controller. This can significantly affect the performance of a fluid-working machine, particularly at low temperature and may be dangerous. It is not practical to overcome these forces simply by providing stronger magnetic fields to hold the valve open as this would increase the power consumption of the valve and slow down release of the valve.

Similar issues may arise in other types of fluid working machine where fluid flows through the valve seat during at least some operating circumstances in the same sense as the valve member moves towards the valve seat to close the valve.

The aim of the invention is to provide a valve assembly suitable for regulating the flow of fluid between a working chamber of a fluid-working machine and a fluid manifold, in which the effects of some or all of these four forces are mitigated or obviated. This is achieved in some embodiments by providing an opposing force generated by the action of fluid flowing through the valve assembly and thereby mitigating or obviating the effects of some or all of these four forces. WO 01/69114 (Morton and Lodge), GB 2,016,168 (Copes Vulcan) and U.S. Pat. No. 3,921,668 (Self) disclose valves in which low pressure regions may arise as a result of restrictions on fluid flow. However, these valves are not suitable for regulating the flow of fluid between a working chamber of a fluid-working machine and a fluid manifold and the low pressure regions are not used to generate forces acting to prevent closure of the valves.

By mitigating the effects of some of all of these four forces, the likelihood of the valve closing at the wrong time is reduced, and the power consumption of the valve assembly can in some circumstances be reduced. The valve may also have a longer working life than would otherwise be the case.

SUMMARY OF THE INVENTION

According to a first aspect of the present invention there is provided a valve assembly for regulating the flow of fluid between a working chamber of a fluid-working machine and a fluid manifold, the valve assembly comprising a valve body comprising a valve seat, a fluid passage extending through the valve body, and a travelling member comprising a valve member, which valve member is operable between an open position in which the valve member is spaced apart from the valve seat and fluid can flow through the fluid passage and a closed position in which the valve member is in sealing contact with the valve seat preventing fluid from flowing through the fluid passage, the valve assembly defining a fluid flow path passing, in a first fluid flow mode, between the valve member and the valve seat, and into the fluid passage, characterised in that the fluid flow path includes a constricted flow region and the valve assembly further comprises a reduced pressure chamber in communication with both a first surface of the travelling member and the constricted flow region.

By a constricted flow region we refer to a region of a conduit through which fluid flows that has a smaller cross-sectional area through which fluid flows than the fluid flow path upstream of the constricted flow region and typically also a smaller cross-sectional area through which fluid flows than the fluid flow path downstream of the constricted flow region. Thus, the pressure of fluid in the constricted flow region will be reduced relative to fluid which is upstream, and typically also downstream, of the constricted flow region, by virtue of the Venturi effect. By "cross-sectional area through which fluid flows" we exclude the cross-sectional area of any member which fluid flows around, but not through. For example, in some embodiments, a valve stem or other member which is impermeable to fluid, and around which fluid flows, may be located within a conduit, such as the fluid passage, thereby constricting flow. As the reduced pressure chamber is in communication with the constricted flow region, the pressure within the reduced pressure chamber will also be reduced to below the pressure of received fluid upstream of the constricted flow region, and typically also downstream of the constricted flow region, when fluid is flowing through the fluid flow path. Thus, a force is exerted on the travelling member which can resist closure of the valve. Typically, the reduced pressure chamber is arranged to exert a force on the travelling member by way of a pressure reduction in the reduced pressure chamber when fluid is flowing along the fluid flow path, through the constricted flow region, which force acts to resist closure of the valve.

By the reduced pressure chamber we refer to a chamber capable of supporting a fluid pressure which is lower than the outlet pressure, for example a chamber defined by the body of the valve and the first surface of the travelling member. The valve body and travelling member are typically formed of metal and so the reduced pressure chamber can sustain a low pressure (relative to the outlet pressure) and exert a significant force on the travelling member. Typically, other than the part defined by the travelling member, the reduced pressure chamber is fixed in position (for example, integral to or fixedly mounted to the valve body). This enables a higher force to be exerted than would be the case if the reduced pressure chamber was defined predominantly by a moveable part.

Typically, the travelling member is coupled (e.g. mechanically coupled) to the valve member so that movement of the first surface of the travelling member away from the reduced pressure chamber is coupled to movement of the valve member from the open position towards the closed position, at least when the valve is open. Thus, the reduced pressure which arises in the reduced pressure chamber in use exerts a force which acts to resist closure of the valve. The first surface of the travelling member may be rigidly coupled to the valve member. However, the invention is applicable where there is a compliant coupling, or engageable coupling between the first surface of the travelling member and the valve member. For example, the travelling member may comprise a rigid stem having a first surface and the rigid stem may be resiliently coupled to the valve member. Accordingly, the valve includes a valve closure restriction mechanism comprising the constricted flow region, reduced pressure chamber and first surface of the valve member. These parts are arranged so that closure of the valve member is restricted while fluid flows through the constricted flow region, by virtue of the consequent reduction in pressure in the reduced pressure chamber and the resulting force acting on the valve member by way of the travelling member.

Typically, the valve assembly will also have a second fluid flow mode in which the direction of fluid flow is reversed. The terms downstream and upstream are used herein to refer to the directions generally in the same sense, and opposite sense respectively, to the fluid flow path in the first fluid flow mode. The valve assembly preferably comprises a fluid inlet through which fluid is received in the first fluid flow mode. The valve assembly preferably comprises a fluid outlet through which fluid leaves the valve assembly in the first fluid flow mode. The inlet and outlet may each comprise one or more apertures. The inlet and/or outlet aperture(s) typically extend through the outer wall of the valve assembly, parallel to the direction in which the valve member moves from the open position to the closed position.

The constricted flow region may, for example, have a cross-section area not exceeding 60%, and preferably not exceeding 25%, of the cross-sectional area of an inlet to the valve from where the fluid flow path extends. Thus, the pressure within the reduced pressure chamber is typically less than the pressure of fluid received by the valve assembly when fluid is flowing through the fluid flow path.

Generally, the pressure difference between the reduced pressure chamber and the fluid received by the valve assembly will increase with an increased rate of fluid flow. Accordingly, the force acting on the first surface of the travelling member resulting from the pressure reduction in the reduced pressure chamber will tend to increase as fluid flow rate increases, when the forces listed above in the introduction to the invention are greatest. Thus, a force is generated which opposes the forces on the valve seat generated by the flow of fluid past the valve member in use, mitigating or obviating the effects of the forces listed above.

The valve assembly is especially useful in circumstances where, in at least one operating condition, the valve assembly will be oriented such that the direction in which the valve member moves from the open position to the closed position is in the same sense as the flow of fluid through the valve seat (the first fluid flow mode). In this context, by "in the same sense", we mean that the flow of fluid through the valve seat should have a component parallel, rather than antiparallel, to the direction of movement of the valve member from the open position to the closed position to close the valve member. In many embodiments the flow of fluid through the valve seat will be generally parallel to the direction of movement of the valve member from the open position to the closed position to close the valve member.

In some face seating valve assemblies the overall direction of fluid flow through the valve is generally the same as the direction in which fluid flows through the valve seat. However, this need not be the case. For example, valve assemblies may be employed in which fluid enters or exits the valve assembly radially. In annular valve assemblies, fluid received through the inlet may flow through one or more valve seats in a direction which is generally opposite to the direction in which the fluid was received into the valve assembly.

Typically, the first surface of the travelling member is located on a face the normal of which is directed generally towards, and typically parallel to, the direction in which the valve member moves from the closed position to the open position. The reduced pressure chamber is typically defined in part by the first surface of the travelling member. Typically, the first surface of the travelling member faces in an upstream direction relative to the direction in which fluid which has entered the fluid passage through the valve seat flows through the fluid passage in the first fluid flow mode.

The travelling member may comprise a valve stem on which the valve member is mounted. The first surface of the travelling member may be a surface of a lateral member which extends from the valve stem. The first surface of the travelling member may be rigidly connected to the valve member. For example, the travelling member may comprise a said lateral member including the first surface, a valve stem and the valve member formed as an integrated unit, for example, as a continuous rigid body of metal.

However, the travelling member may comprise a first portion comprising the valve member and a second portion having the first surface thereon, wherein the first and second portions are moveable relative to each other but connected or engageable, at least when the valve member is in the open position, such that the force acting on the first surface of the second portion acts on the valve member at least when the valve is in the open position. A surface of the second portion may bear against a cooperating surface of the first portion when the valve is in the open position thereby transmitting force between the first surface and the valve member. Advantageously, the second portion may comprise an armature actuatable by an electromagnet, so that the valve assembly is an electromagnetically actuated valve (being an example of an electronically actuated valve).

The valve assembly may define a fluid flow path extending around the valve member when the valve is in the open position. This is a configuration in which the forces acting on the valve member due to fluid flow can be especially high. The valve assembly may be configured such that, in the first fluid flow mode, a part of the fluid flow path extends along a periphery of the valve member when the valve is in the open position, in the same sense as the valve member moves towards the valve seat to close the valve member.

It may be that the fluid passage comprises a constricted flow region and the reduced pressure chamber is in communication with the said constricted flow region of the fluid passage. In this case, the flow of fluid through the constricted flow region is typically substantially parallel with the direction of travel of the travelling member between the closed and open positions.

However, the constricted flow region may be upstream of the valve member. The valve assembly may comprise a barrier, fixedly attached to the valve assembly (for example, to the valve body) and arranged to define the reduced pressure chamber intermediate the barrier and the travelling member. In this case the reduced pressure chamber may be defined intermediate the barrier and the valve member. The barrier is typically located upstream of the travelling member (preferably the valve member) in which case the reduced pressure chamber is typically formed upstream of the travelling member (preferably the valve member). Where a barrier is provided, the valve assembly preferably defines a fluid flow path extending between the valve member and the valve body adjacent the valve seat, wherein at least a portion of the region between the valve member and the valve body adjacent the valve seat functions as a constricted flow region in communication with the reduced pressure chamber intermediate the barrier and the valve member. The fluid flow path may extend between the barrier and the valve body and the constricted flow region may be located intermediate the barrier and the valve body.

Further preferred and optional features of the valve assembly where a barrier is provided are discussed in relation to the second aspect of the invention below. Typically, the reduced pressure chamber is in communication with at least one constricted flow region by way of a passage having a cross-sectional area of no more than 10% of the cross-sectional area of the first surface in communication with the reduced pressure chamber. This increases the maximum force which can be exerted on the first surface of the travelling member by virtue of the pressure in the reduced pressure chamber for a given rate of fluid flow.

Typically, the fluid flow path further comprises a high pressure flow region having a greater cross-sectional area than the constricted flow region and the valve assembly further comprises a raised pressure chamber in communication with both a second surface of the travelling member and a said high pressure flow region.

Preferably, the valve assembly is electronically actuatable. By electronically actuatable we include valve assemblies which are passively opened or closed in use, for example, by way of a pressure differential, but which can be actively opened, actively closed, actively latched open, or actively latched closed.

Typically, the valve assembly is a poppet valve and the valve member is a poppet valve head. However, the valve assembly may, for example, be an annular valve.

Where the valve assembly comprises a valve stem, the valve stem may comprise a hollow connecting rod through which the fluid flow path extends. The hollow connecting rod may comprise an aperture through which the reduced pressure chamber communicates with a portion of the interior of the hollow connecting rod which functions as the constricted flow region. It may be that the hollow connecting rod is slidably mounted within a bore of the valve body.

The valve assembly may further comprise a barrier upstream of the valve member, which barrier is formed and arranged to reduce one or more forces which would otherwise act on the valve member as a result of the flow of fluid to urge the valve member towards the valve seat.

Preferably, the barrier is formed and arranged to reduce or remove viscous drag forces across the surface of the valve member at a tangent to a surface of the valve member which would otherwise act on the valve member as a result of the flow of fluid to urge the valve member towards the valve seat in the first fluid flow mode. Preferably, the barrier is formed and arranged to reduce or remove forces arising from a pressure differential created by the shearing of fluid upstream of the valve member which would otherwise act on the valve member as a result of the flow of fluid to urge the valve member towards the valve seat in the first fluid flow mode.

Preferably, the barrier is formed and arranged to reduce or remove acceleration-related forces arising from the acceleration of fluid with a component perpendicular to the axis of flow so that it diverts around the valve member which would otherwise act on the valve member as a result of the flow of fluid to urge the valve member towards the valve seat in the first fluid flow mode.

Preferably, the barrier is arranged directly upstream of the valve member when the valve member is in the open position. Thus, at least some of the said forces may be exerted on the barrier rather than the valve member. Preferably, the barrier is fixedly mounted to the valve assembly. Typically, the barrier is fixedly mounted to the valve body.

Preferably, the barrier is arranged to shield a surface of the valve member (typically all or part of the upstream surface of the valve member) from fluid flow which would otherwise exert forces urging the valve member towards the valve seat in the first fluid flow mode. Thus, a region of no or minimal fluid flow is typically formed on the upstream side of the valve member as a result of the presence of the barrier. The barrier may be formed and arranged so that the fluid flow path does not extend across a part of the upstream surface of the valve member.

The valve assembly may be arranged so that, in the first fluid flow mode, received fluid flows towards the barrier and is diverted around a periphery of the valve member by the barrier.

Typically, the barrier extends across the entire upstream facing surface area of the valve member. However, some reduction in forces due to fluid flow may be achieved by employing a barrier which extends across a portion of the upstream facing surface area of the valve member.

The barrier may comprise a barrier rim which extends at least partially around a periphery of the valve member.

Preferably, the valve member and barrier are formed and arranged to define a fluid containing volume therebetween when the valve member is in the open position, and typically also when the valve member is in the closed position. Preferably, the valve member and barrier are formed and arranged to avoid the formation of a squeeze film between cooperating faces of the valve member and barrier when the valve member is in the open position, which would otherwise restrict opening of the valve assembly.

The valve assembly typically comprises an inlet through which fluid is received in the first fluid flow mode. The barrier may be located intermediate the inlet and the valve member. However, in some embodiments, the barrier extends upstream of the inlet.

The barrier may be formed as a stamped metal sheet.

The barrier may comprise a travelling member guiding formation (such as an aperture) arranged to cooperate with and guide the travelling member (preferably, the valve member).

The valve member typically comprises a downstream surface, at least part of which is operable to contact the valve seat when the valve is in the closed position. The barrier, valve member and valve body may be formed and arranged so that fluid flowing along the fluid flow path flows past the downstream surface at an angle of at least 80°, and preferably at least 85°, more preferably at least 90° and most preferably greater than 90° to the direction in which the valve member is operable to move from the open position to the closed position. Thus, the component of shear forces exerted on the valve member by fluid flowing past the downstream surface of the valve member which act parallel to the direction in which the valve member moves from the open position to the closed position are reduced or removed or, where the said angle is greater than 90°, act to urge the valve member towards the open position.

The valve assembly may be formed and arranged so that fluid flowing along the said fluid flow path is incident on the downstream surface of the valve member at an angle of at least 80° to the direction in which the valve member is operable to travel between the open position and the closed position.

Preferably, the valve assembly is formed such that fluid flowing along the said fluid flow path is incident on the downstream surface of the valve member at an angle of at least 85°, and more preferably at least 90°, to the direction in which the valve member is operable to travel between the open position and the closed position. In some embodiments, the valve assembly is formed such that fluid flowing along the said fluid flow path is incident on the downstream surface of the valve member at an angle of greater than 90° to the direction in which the valve member is operable to travel between the open position and the closed position.

Thus, the shear forces which act on the downstream surface of the valve member have only a low, no, or a negative component which is parallel to the direction in which the valve member is operable to travel between the open position and the closed position, thereby reducing or removing forces arising from fluid shear urging the valve member towards the closed position.

The valve body adjacent to the valve seat may be adapted to cause fluid flowing along the fluid flow path to be incident on the downstream surface of the valve member at an angle of at least 80°, at least 85°, at least 90°, or greater than 90°, to the direction in which the valve member is operable to travel between the open position and the closed position.

A barrier may be provided upstream of the valve member which is adapted to cause fluid flowing along the fluid flow path to be incident on the downstream surface of the valve member at an angle of at least 80°, at least 85°, at least 90°, or greater than 90°, to the direction in which the valve member is operable to travel between the open position and the closed position.

The downstream surface of the valve member on which fluid flowing along the fluid flow path is first incident may be oriented at angle of at least 80°, at least 85°, at least 90°, or greater than 90°, to the direction in which the valve member is operable to travel between the open position and the closed position.

The invention extends in a second aspect to a fluid working machine comprising a working chamber of cyclically varying volume, a high pressure manifold and a low pressure manifold, and a valve assembly according to the first aspect of the invention which regulates the supply of fluid to or from the high pressure manifold or the low pressure manifold to the working chamber, wherein fluid is operable to flow from the working chamber through the valve seat in the same sense that the valve member of the said valve assembly moves towards the valve seat to close the valve assembly, during at least part of at least some cycles of working chamber volume.

A plurality of said working chambers may be provided. The fluid working machine may further comprise a controller which is operable to actively control the said valve assembly, and optionally one or more other valves, in phased relation to cycles of working chamber volume, to determine the net displacement of the fluid by the or each working chamber on a cycle by cycle basis, to thereby determine the time averaged net displacement of fluid by the working machine or one of more groups of said working chambers. The fluid working machine may further comprise a working chamber phase or volume sensor to allow it to actively control the said valve assembly in phased relation to cycles of working chamber volume.

Preferably, the pressure difference between the high pressure manifold and the low pressure manifold and the throughput of fluid through the valve assembly, are such that the fluid working machine would not function correctly in at least some operating conditions were it not for the presence of the reduced pressure chamber in communication with the first surface (and the barrier in embodiments which further comprise the barrier), as the primary valve would close too soon due to forces arising from fluid flow between the valve head and the valve seat.

Preferably, the volume of the working chamber cycles with a frequency of at least 20 Hertz. Preferably, the valve assembly is operable to open, or to close, in less than 10 ms, or less than 5 ms. Preferably, the pressure differential between the low and high pressure manifolds is at least 20 bar. Preferably, the volume of the working chamber is greater than 1 cc, greater than 5 cc, or more preferably greater than 10 cc.

The fluid working motor may function only as a motor, or only as a pump. Alternatively, the fluid working motor may function as a motor or a pump in alternative operating modes.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
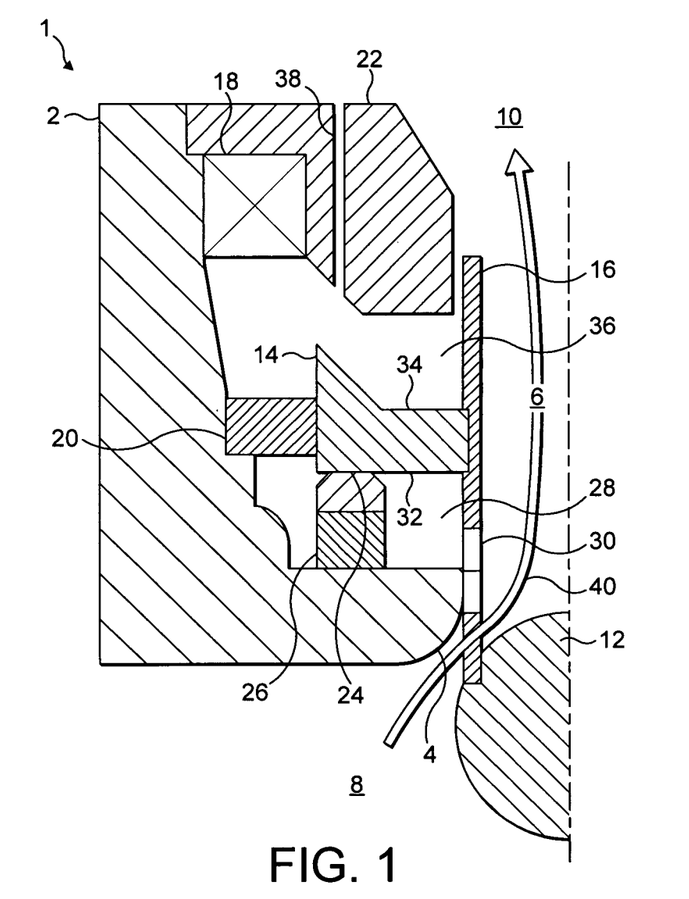
FIG. 1 is a part sectional view of a valve assembly according to the present invention.

With reference to FIG. 1, a valve assembly 1 comprises a valve body 2 made from steel, which defines a valve seat 4 and a fluid passage 6 which, when the valve is open, extends from an inlet 8 through which fluid is received from a working chamber (not shown), to an outlet 10. A poppet valve head 12 (functioning as the valve member) is operable between an open position in which it is spaced apart from the valve seat to allow fluid to flow between the inlet and the outlet by way of the fluid passage, and a closed position in which it is held in sealing contact with the valve seat, thereby preventing fluid flow into or out of the fluid passage through the valve seat.

The terms inlet and outlet refer to apertures at opposite ends of a fluid flow path through the valve assembly where fluid is flowing through the valve seat into the fluid passage in the same sense that the poppet valve head moves from the open position to the closed position (the first fluid flow mode). In many practical applications, fluid will flow through the fluid passage in the opposite direction (the second fluid flow mode), at different times. In this example embodiment, the valve assembly is included in a fluid working machine of the type disclosed in EP 0 361 927, EP 0 494 236 and EP 1 537 333, and oriented such that the fluid exhausted from a working chamber to a low pressure manifold passes through the valve assembly in the first fluid flow mode. Nevertheless, there will be other practical applications of the valve assembly in which fluid flows in the first flow mode to regulate the flow of fluid into a working chamber, or to or from conduits or chambers other than working chambers.

The poppet valve head is connected to an annular armature 14 by way of a tubular connecting rod 16. The poppet valve head, armature and hollow tubular connecting rod (functioning as a valve stem) together form a travelling member which is rigid and moves as a single unit. Alternative valve arrangements are possible in which the component parts of the travelling member do not always move as a single unit. For example, the armature may be resiliently mounted to the connecting rod. However, forces in a direction opposing the closure of the valve are transferred from the armature through the connecting rod to the poppet valve head.

The valve assembly further comprises an electromagnet 18. A magnetic circuit is formed by the valve body, a flux bridge 20, the armature and a ferromagnetic plug 22. When a current is passed through the electromagnet, a force acts on the armature to pull the tubular connecting rod and thus to urge the poppet valve head towards the valve seat. When no current is present, the armature is pulled towards and held against a stop 24 by an annular permanent magnet 26, or by a spring (not shown). The electromagnet, the peak current through the electromagnet, the configuration of the magnetic circuit and the strength and location of the permanent magnet are selected so that the net force acting on the armature when current is passed through the electromagnet substantially exceeds the force due to the permanent magnet.

The valve body further defines a first chamber 28 (functioning as the reduced pressure chamber) which is in fluid communication with the fluid passage by way of an aperture 30 in the connecting rod. The first chamber is in direct contact with an inlet facing surface 32 of the armature (functioning as the first surface of the travelling member). The opposite, outlet facing surface 34 of the armature is in direct contact with a second chamber 36 which is in fluid communication with the outlet of the valve assembly by way of a passage 38 through the plug.

Figure 2:
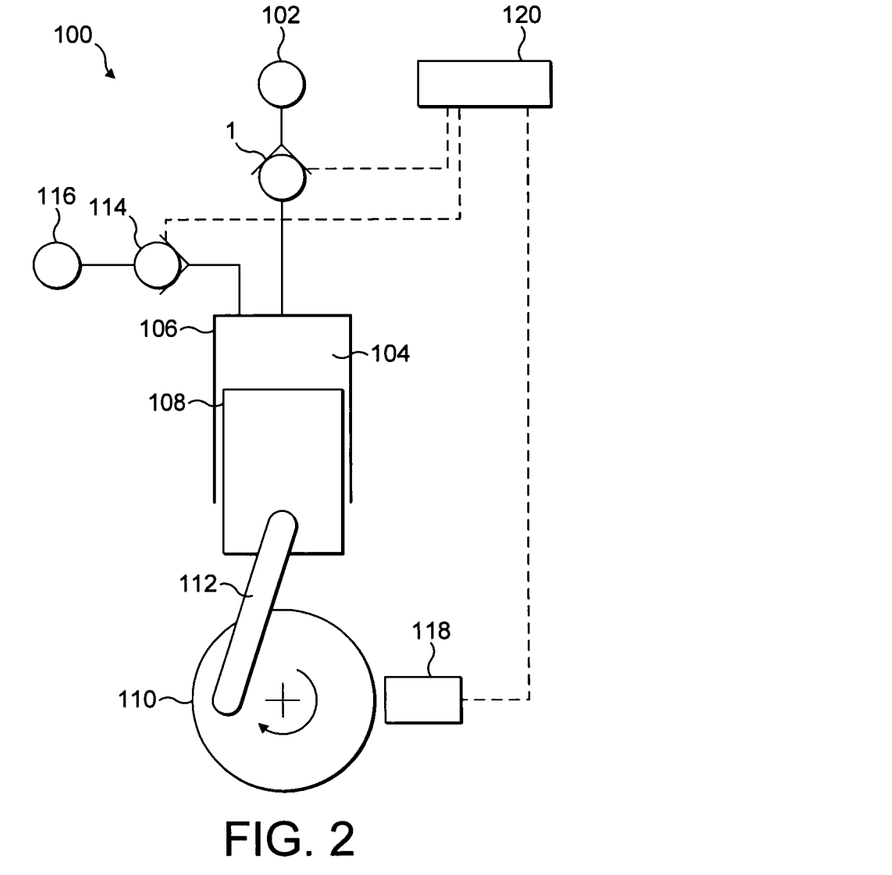
FIG. 2 is a schematic diagram of a fluid-working machine incorporating the valve assembly.

FIG. 2 is a schematic diagram of a fluid working machine, shown generally as 100, incorporating the example valve assembly 1 as a low pressure valve which regulates the flow of hydraulic fluid between a low pressure manifold 102 and a working chamber 104. The low pressure valve is oriented such that fluid exhausted from the working chamber to the low pressure manifold flows through the valve seat in the same sense that the poppet valve head moves from the open position to the closed position, that is to say in the first fluid flow mode, during each exhaust stroke when the fluid working machine functions as a motor and during idle exhaust strokes when the fluid working machine functions as a pump.

The working chamber is defined by the interior of a cylinder 106 and a piston 108 which is mechanically linked to the rotation of a crankshaft 110 by a suitable mechanical linkage 112, and which reciprocates within the cylinder to cyclically vary the volume of the working chamber. A high pressure valve 114 regulates the flow of hydraulic fluid between a high pressure manifold 116 and the working chamber. The example fluid working machine includes a plurality of working chambers mechanically linked to the rotation of the same crankshaft, with appropriate phase differences. A shaft position and speed sensor 118 determines the instantaneous angular position and speed of rotation of the shaft, and transmits shaft position and speed signals to a controller 120, which enables a controller to determine instantaneous phase of the cycles of each individual working chamber. The controller is typically a microprocessor or microcontroller which executes a stored program in use. The low pressure valve is electronically actuatable, and the opening and/or the closing of the high and/or low pressure valves is under the active control of the controller.

The example fluid working machine is operable to function as either a pump or a motor in alternative operating modes. When operating as a pump, low pressure fluid is received from the low pressure manifold, and output through the high pressure valve to the high pressure manifold. Shaft power is therefore converted into fluid power. When operating as a motor, high pressure fluid is received from the high pressure manifold, and output through the low pressure valve to the low pressure manifold. Fluid power is therefore converted into shaft power.

The controller regulates the opening and/or closing of the low and high pressure valves to determine the displacement of fluid through each working chamber, on a cycle by cycle basis, in phased relationship to cycles of a working chamber volume, to determine the net throughput of fluid through the machine. Thus, the fluid working machine operates according to the principles disclosed in EP 0 361 927, EP 0 494 236, and EP 1 537 333, the contents of which are incorporated herein by virtue of this reference.

During an idle exhaust stroke, fluid within the working chamber is vented through the low pressure valve to the low pressure manifold. This typically occurs within a few milliseconds and so the peak rate of fluid flow past the poppet valve head, through the valve seat and fluid passage is therefore very high. As a result, forces (1) through (4) described in the introduction above act on the poppet valve head, urging the poppet valve head towards the valve seat.

Referring to FIG. 1, fluid passes the valve member and enters the fluid passage, along path 40. The interior channel of the tubular connector has a significantly smaller cross-sectional area than either the outlet from the working chamber, or the low pressure manifold adjacent the valve assembly. Thus, the interior channel of the tubular connector functions as a constricted flow region. Accordingly, the pressure within the interior channel of the tubular connector drops below the pressure within either the working chamber or the low pressure manifold, by way of the Venturi effect. As the first chamber is in fluid communication with the interior channel of the tubular connector, the pressure within the first chamber also drops below the pressure within either the working chamber of the low pressure manifold. The pressure differential between the first chamber and the working chamber and low pressure manifold increases with fluid flow rate. At the same time, the pressure within the second chamber, on the opposite side of the armature, remains substantially the same as the pressure in the low pressure manifold. As a result of the pressure differential between the first chamber and the second chamber, a net force acts on the armature in a direction generally parallel to the direction in which the valve member moves from the closed position to the open position, thereby opposing the forces arising from fluid flow past the valve member which acting to close the valve, retaining the armature against the seat and retaining the valve in the open position. Either the flux bridge or the stop 24 operates as a seal to at least substantially seal the first and second chambers from each other.

The forces acting on the armature as a result of the pressure differential thereby act to resist closure of the valve. This counteracting force acting on the armature increase with the rate of fluid flow, and is greatest at approximately the same time as the forces arising from fluid flow past the valve member are at their greatest.

In fluid working machines of the type disclosed in EP 0 361 927, EP 0 494 236, valve assemblies typically open or close at, or close to, top dead centre or bottom dead centre, when the pressure difference across the valve which opens or closes is minimal and the rate of fluid flow is zero (where a closed valve is to be opened) or approximately zero (where an open valve is to be closed). Although there can be some flexibility in the timing of the opening and closing of valves, for example to implement the part cylinder pumping strokes disclosed in EP 1 537 333, it remains generally preferable to open or close valves at times when the pressure difference across the valve is minimal and (if the valve is open) the rate of fluid flow is minimal. Valves which can open, or be held open, against substantial pressure differentials can be designed and built by one skilled in the art; they typically consume a substantial amount of energy either in the course of the movement of the valve or in the course of holding the valve stationary against force due to the flow. Accordingly, it is advantageous that this mechanism has minimal or no effect on the opening or closing of the valve when there is minimal or no fluid flow through the valve.

Figure 3:
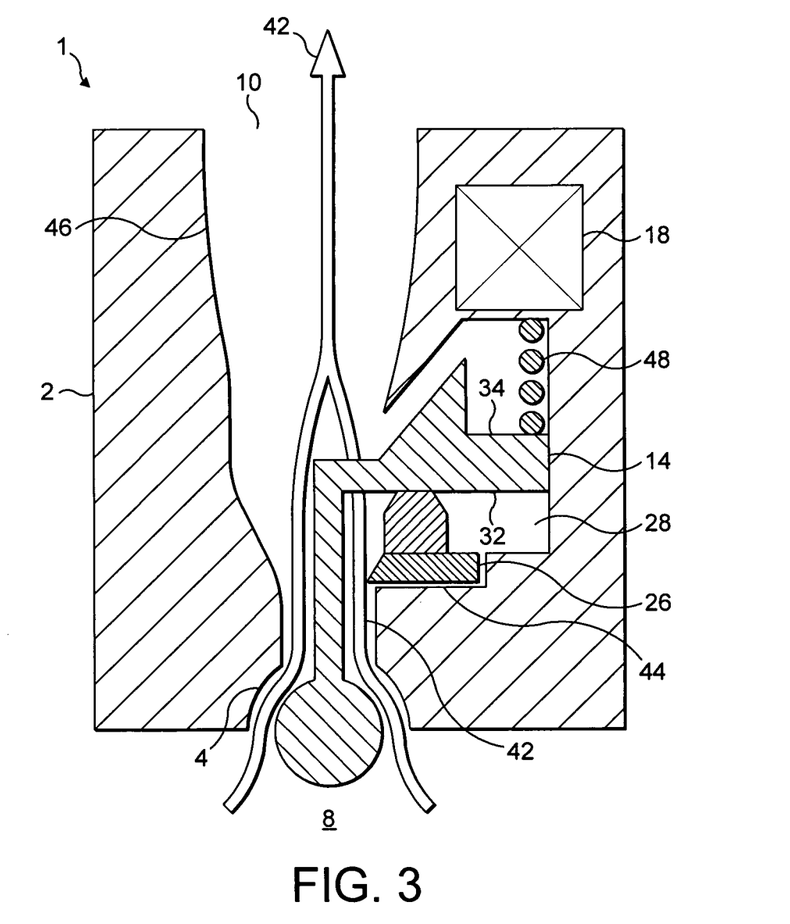
FIG. 3 is a part sectional view of an alternative valve assembly according to the present invention.

In an alternative embodiment of a valve assembly, illustrated in FIG. 3, the annular travelling member includes a valve stem which extends axially along part of the length of the fluid passage. As before, the valve assembly is suitable for use with a fluid working machine as illustrated with reference to FIG. 2 and is used to regulate the flow of fluid between a working chamber and the low pressure manifold, and oriented such that the path of fluid flow 42 through the valve seat, when fluid is vented from the working chamber to the low pressure manifold, is in the same sense that the valve member moves from the open position to the closed position. The armature is part of a lateral arm extending from the valve stem. A first chamber and second chamber are provided on opposite sides of the armature as before. The first chamber, located on the inlet side of the armature, communicates with a constricted flow region of the fluid passage 42 by way of a connecting passage 44. The constricted flow region is constricted by virtue of its restricted inner and outer circumferences. The valve stem therein may be partially cut away to increase the flow area and reduce drag on the valve stem by fluid flowing past it. The second chamber, located on the outlet side of the armature, communicates with a further section of the fluid passage 46 which has a greater cross-sectional area than the constricted flow region by virtue of having a greater outer (and/or inner) circumference. In this example embodiment, a spring 48 is provided to bias the armature and thus the entire travelling member towards the inlet. Again, when fluid flows through the fluid passage, the pressure in the constricted flow region is less than the pressure at the inlet, the pressure in the first chamber is less than in the second chamber and thus forces act on the travelling member to urge the valve member to the open position.

Figure 4:
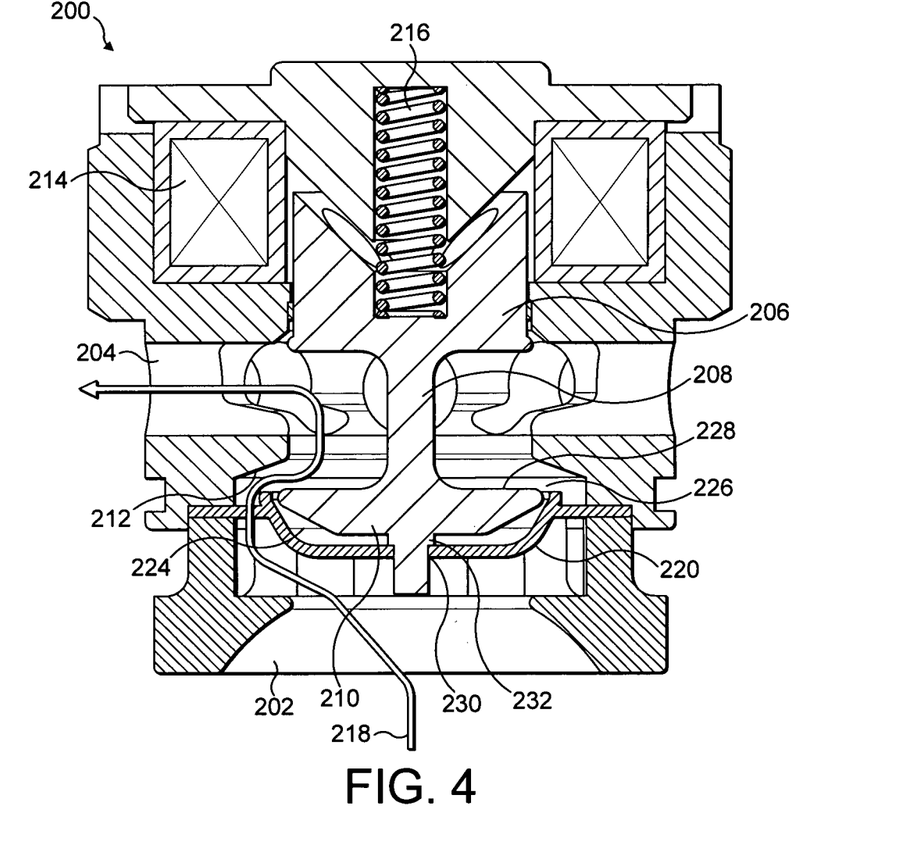
FIG. 4 is a sectional view of an alternative valve assembly according to the present invention.

FIG. 4 illustrates an alternative embodiment of a valve assembly suitable for use with a fluid working machine such as the fluid working machine described with reference to FIG. 2. As before, the valve assembly 200 includes an inlet 202 for receiving fluid from a working chamber where appropriate and an outlet 204 (leading in this case to a plurality of radially extending apertures). A travelling member includes an armature 206 which is formed integrally with a valve stem 208 and poppet valve head 210. The poppet valve head is operable between the open position illustrated in FIG. 4 and a closed position in which is seals against a valve seat 212. An electromagnet 214 can be used to close the valve under the active control of the controller and a return spring 216 is provided to bias the travelling member away from the electromagnet and therefore bias the poppet valve head to the open position. In a first fluid flow mode, for example during an idle exhaust stoke, fluid flows along path 218. Accordingly, the four forces set out in the introduction to the invention above act to urge the poppet valve head towards the valve seat. If these forces exceeded the force exerted on the travelling member by the return spring, an involuntary pumping stroke would occur, outside of the control of the controller.

However, the valve assembly further includes a barrier 220 on the upstream side of the valve head, away from the valve seat, fixed to the valve assembly by radial connecting arms 222 between which fluid can flow. The barrier defines a reduced pressure chamber 224 which communicates with a constricted flow region 226 around the periphery of the valve member. Accordingly, when fluid flows out through the valve assembly, along the flow path 218, the pressure drops in the constricted flow region and therefore also in the reduced pressure chamber. The pressure acting on the opposite sealing surface 228 of the poppet valve head is greater as the cross-section of the fluid flow path is greater. Accordingly, the poppet valve head (here functioning as the travelling member) therefore feels a force urging the valve member away from the valve seat. This force increases with fluid flow rate, providing a force which is at its greatest at approximately the same time as the forces which urge the valve member to the valve seat are at their greatest.

The travelling member extends beyond the poppet valve head, through an aperture 230 in the barrier and includes a flange 232 which cooperates with the periphery of the aperture to limit movement of the poppet valve head away from the valve seat so that there is always at least some fluid in the chamber between the barrier and the poppet valve head. This avoids the formation of a squeeze film which would provide unnecessarily strong resistance to closing, increase the power consumption of the valve assembly and reduce the operating speed.

Furthermore, the barrier extends across the entire surface area of the upstream side. of the valve member and also functions to shield the poppet valve head from the second through fourth forces mentioned in the background to the invention above. The barrier will encounter at least shear forces and acceleration-related forces acting away from the poppet valve head, but as the barrier is fixedly mounted to the body of the valve assembly these forces will be transmitted to the body of the valve assembly and have no effect on the poppet valve head.

The barrier includes a lip 324 extending from the barrier in a downstream direction, around the periphery of the poppet valve head, thereby further reducing at least viscous drag forces. In some embodiments, the barrier may cover only a portion of the surface area of the poppet valve head in which case the forces urging the valve closed will still be reduced by this mechanism, but to a lesser extent.

Figure 5:
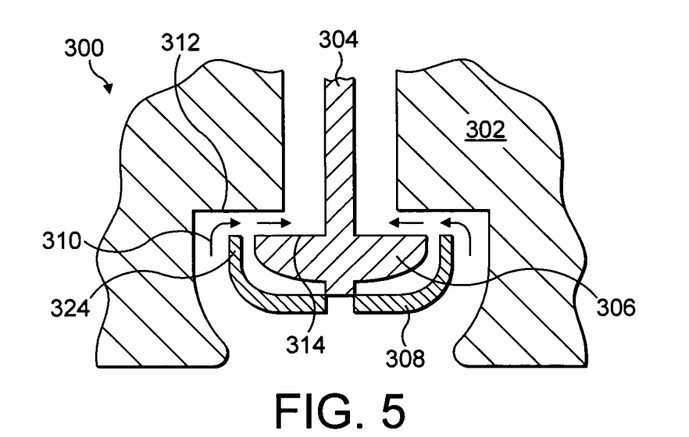
FIG. 5 is a sectional view of the inlet and valve member of an alternative valve assembly.
Figure 6:
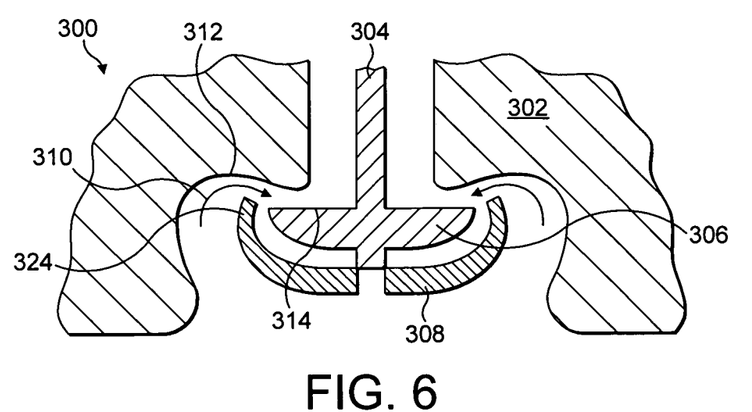
FIG. 6 is a sectional view of the inlet and valve member of an alternative valve assembly.

With reference to FIG. 5, an alternative valve assembly includes a valve body 302 and an actuated travelling member including a valve stem 304 and poppet valve head 306 as before. A barrier 308 is arranged upstream of the poppet valve head but the barrier, the valve body adjacent to the valve seat 312, and the downstream surface 314 of the poppet valve head are formed and arranged so the fluid flow path 310 is incident on the downstream surface of the poppet valve head at around 90° to the direction in which the poppet valve head would move from the open position to the closed position. Thus, shear forces acting on the downstream surface of the poppet valve head are directed radially inwards and provide no or minimal contribution to forces acting to urge the poppet valve head to the closed position. In an alternative embodiment illustrated in FIG. 6, the valve body adjacent to the valve seat is configured so that fluid flowing along the fluid flow path is incident on the downstream surface of the poppet valve head at an angle of greater than 90° to the direction in which the poppet valve head would move from the open position to the closed position. In these examples, the downstream surface of the poppet valve head has a normal which is parallel to the direction in which the poppet valve head would move. However, the poppet valve head may have an alternative profile. For example, the downstream surface of the poppet valve head may be concave or slightly convex.

Figure 7:
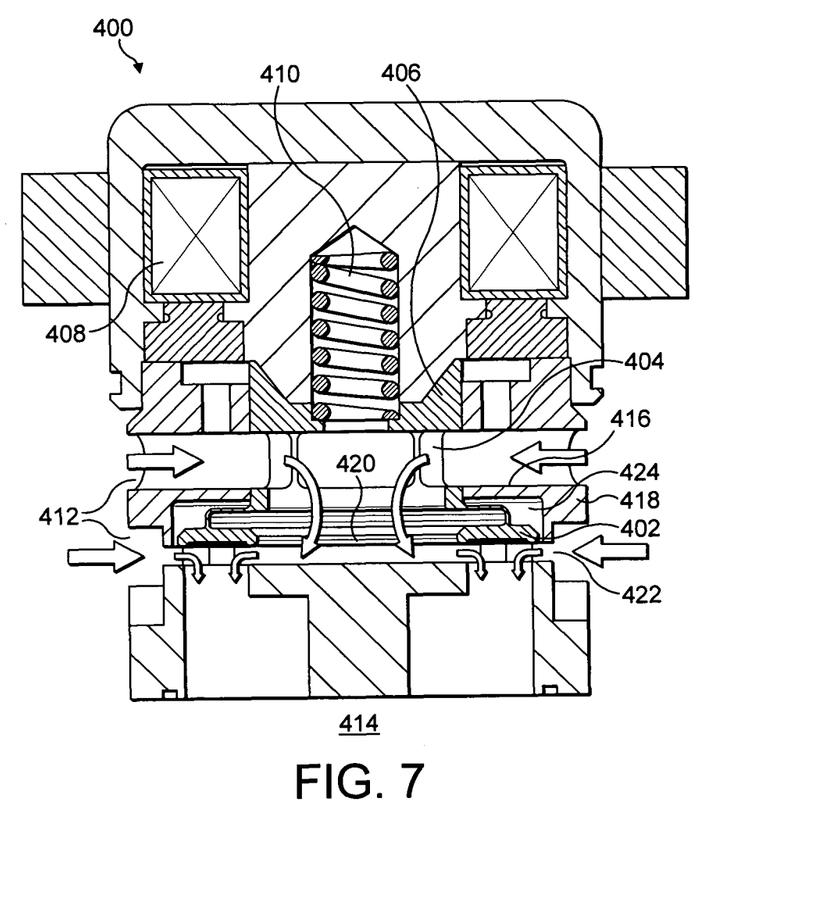
FIG. 7 is a cross-section through a valve assembly according to a further example.

In a further embodiment of a valve assembly 400, illustrated in FIG. 7, the valve member is formed by an annular valve member 402 attached through hollow valve stem 404 to a moving pole (armature) 406, actuatable by electromagnet 408. A return spring 410 biases the valve towards the closed position. In the first flow mode, illustrated in FIG. 7, fluid flows radially inwards through ports 412, connected to a high pressure manifold, and out to a working chamber 414. A barrier is formed by a circular flange 416 extending radially inwards from the body 418 of the valve member. The barrier overlaps the outer edge of the annular valve member and diverts fluid around the inner edge of the annular valve member through central valve member aperture 420 in the valve stem, thereby reducing kinetic forces which would otherwise act on the annular valve member urging it to the closed position. Furthermore, a constricted flow region 422 is formed where the fluid flow through the ports immediately adjacent to the valve member is constricted, and a low pressure region 424 is in fluid communication with the constricted flow region. Thus, the current consumption of the electromagnet required to hold the valve open against the flow of fluid is reduced in contrast to a valve lacking the barrier.

This valve is especially useful as a high pressure valve in a fluid-working machine, for regulating the flow of fluid from a high pressure manifold to a working chamber of cyclically varying volume, under the active control of a fluid-working machine controller.

Further variations and modifications may be made within the scope of the claimed invention.

The invention claimed is:

1. A valve assembly for regulating a flow of fluid between a working chamber of a fluid-working machine and a fluid manifold, the valve assembly comprising:
   a valve body comprising a valve seat, a fluid passage extending through the valve body, and a travelling member comprising a valve member, operable between an open position in which the valve member is spaced apart from the valve seat and fluid can flow through the fluid passage and a closed position in which the valve member is in sealing contact with the valve seat preventing fluid from flowing through the fluid passage,
   the valve assembly defining a fluid flow path passing, in a first fluid flow mode, between the valve member and the valve seat, and into the fluid passage,
   wherein
   the fluid flow path includes a constricted flow region and the valve assembly further comprises a reduced pressure chamber in communication with both a first surface of the travelling member and the constricted flow region, whereby a force is exerted on the travelling member by way of a pressure reduction in the reduced pressure chamber when fluid is flowing through the constricted flow region, and said force acts to resist closure of the valve.

2. A valve assembly according to claim 1, wherein the first surface of the travelling member is located on a face, the normal of which is directed towards the direction in which the valve member is configured to move from the closed position to the open position.

3. A valve assembly according to claim 1, wherein the first surface of the travelling member is rigidly connected to the valve member.

4. A valve assembly according to claim 1,
   wherein the travelling member comprises a first portion comprising the valve member and a second portion having the first surface thereon,
   wherein the first and second portions are moveable relative to each other but connected or engageable, at least when the valve member is in the open position, such that the force acting on the first surface of the second portion acts on the valve member at least when the valve is in the open position.

5. A valve assembly according to claim 1, wherein the valve assembly comprises an electromagnet, the travelling member comprises an armature, and the first surface of the travelling member is an upstream surface of the armature.

6. A valve assembly according to claim 1, wherein the fluid flow path extends around the valve member when the valve is in the open position.

7. A valve assembly according to claim 1, wherein the fluid passage comprises the constricted flow region, and the reduced pressure chamber is in communication with said constricted flow region of the fluid passage.

8. A valve assembly according to claim 1, wherein the constricted flow region is upstream of the valve member.

9. A valve assembly according to claim 1, wherein the valve assembly comprises a barrier, fixedly attached to the valve assembly and arranged to define the reduced pressure chamber intermediate the barrier and the travelling member.

10. A valve assembly according to claim 1, wherein the reduced pressure chamber is in communication with at least one constricted flow region by way of a passage having a cross-sectional area of no more than 10% of the cross-sectional area of the first surface in communication with the reduced pressure chamber.

11. A valve assembly according to claim 1, wherein
    the fluid flow path further comprises a high pressure flow region having a greater cross-sectional area than the constricted flow region, and
    the valve assembly further comprises a raised pressure chamber in communication with both a second surface of the travelling member and said high pressure flow region.

12. A valve assembly according to claim 1, wherein the valve assembly comprises a valve stem, the valve stem comprising a hollow connecting rod through which the fluid flow path extends.

13. A valve assembly according to claim 1, which is electronically actuatable.

14. A fluid working machine comprising:
    a working chamber of cyclically varying volume, a high pressure manifold and a low pressure manifold, and a valve assembly according to claim 1 which is configured to regulate the supply of fluid to or from the high pressure manifold or the low pressure manifold to the working chamber,
    wherein the valve assembly is configured so that the fluid is operable to flow from the working chamber through the valve seat in the same sense that the valve member of said valve assembly moves towards the valve seat to close the valve assembly, during at least part of at least some cycles of working chamber volume.

15. A fluid working machine according to claim 14, wherein the fluid working machine further comprises a controller which is operable to actively control said valve assembly, and one or more other valves, in phased relation to cycles of working chamber volume, to determine a net displacement of the fluid by the or each working chamber on a cycle by cycle basis, to thereby determine a time averaged net displacement of fluid by the working machine or one of more groups of said working chambers.

16. A fluid working machine according to claim 14, wherein a pressure difference between the high pressure manifold and the low pressure manifold and the throughput of fluid through the valve assembly, are such that the fluid working machine would not function correctly in at least some operating conditions were it not for the presence of the reduced pressure chamber in communication with the first surface.

17. A fluid working machine according to claim 14, further comprising: a controller which is operable to actively control said valve assembly in phased relation to cycles of working chamber volume, to determine a net displacement of the fluid by the or each working chamber on a cycle by cycle basis, to thereby determine a time averaged net displacement of fluid by the working machine or one of more groups of said working chambers.

18. A valve assembly for regulating a flow of fluid between a working chamber of a fluid-working machine and a fluid manifold, the valve assembly comprising:

a valve body comprising a valve seat, a fluid passage extending through the valve body, and a travelling member comprising a valve member, which valve member is operable between an open position in which the valve member is spaced apart from the valve seat and fluid can flow through the fluid passage and a closed position in which the valve member is in sealing contact with the valve seat preventing fluid from flowing through the fluid passage, the valve assembly defining a fluid flow path passing, in a first fluid flow mode, between the valve member and the valve seat, and into the fluid passage, wherein the fluid flow path includes a constricted flow region and the valve assembly further comprises a reduced pressure chamber in communication with both a first surface of the travelling member and the constricted flow region, and the valve assembly comprises a valve stem, the valve stem comprising a hollow connecting rod through which the fluid flow path extends.

* * * * *